(12) United States Patent
Zilka

(10) Patent No.: US 11,741,191 B1
(45) Date of Patent: Aug. 29, 2023

(54) PRIVACY-SENSITIVE TRAINING OF USER INTERACTION PREDICTION MODELS

(71) Applicant: Google LLC, Mountain View, CA (US)

(72) Inventor: Lukas Zilka, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/939,492

(22) Filed: Sep. 7, 2022

Related U.S. Application Data

(63) Continuation of application No. 16/393,777, filed on Apr. 24, 2019.

(51) Int. Cl.
| | |
|---|---|
| G06N 20/00 | (2019.01) |
| G06F 18/214 | (2023.01) |
| G06V 10/46 | (2022.01) |
| G06F 17/18 | (2006.01) |
| G06N 3/02 | (2006.01) |
| G06F 18/2415 | (2023.01) |

(52) U.S. Cl.
CPC .......... *G06F 18/2148* (2023.01); *G06F 17/18* (2013.01); *G06F 18/2415* (2023.01); *G06N 3/02* (2013.01); *G06N 20/00* (2019.01); *G06V 10/46* (2022.01); *G06V 10/473* (2022.01)

(58) Field of Classification Search
CPC .. G06F 18/2148; G06F 17/18; G06F 18/2415; G06F 16/9535; G06F 16/951; G06F 16/972; G06F 3/04842; G06N 20/00; G06N 3/02; G06N 3/08; G06V 10/46; G06V 10/473; G06V 20/70; G06K 9/6257; G06K 9/6277; G06K 9/6256; G06K 9/6265; G06T 7/97; G06Q 30/0269
See application file for complete search history.

(56) References Cited

U.S. PATENT DOCUMENTS

| | | | |
|---|---|---|---|
| 9,785,712 B1 * | 10/2017 | Lazar | ............... G06F 16/24578 |
| 10,043,109 B1 | 8/2018 | Du et al. | |
| 10,061,820 B2 | 8/2018 | Logachev | |
| 10,445,683 B1 * | 10/2019 | Hession | .............. G06F 16/2228 |

(Continued)

FOREIGN PATENT DOCUMENTS

| | | |
|---|---|---|
| AU | 2010210726 A1 | 8/2011 |
| CA | 2923979 A1 | 3/2014 |

(Continued)

OTHER PUBLICATIONS

Hartman, "Federated Learning," Freie Universitat Berlin, Aug. 20, 2018, 84 pages.

*Primary Examiner* — Steven P Sax

(74) *Attorney, Agent, or Firm* — Brake Hughes Bellermann LLP

(57) ABSTRACT

Methods, systems, and apparatus, including computer programs encoded on a computer storage medium, for collaboratively training an interaction prediction machine learning model using a plurality of user devices in a manner that respects user privacy. In one aspect, the machine learning model is configured to process an input comprising: (i) a search query, and (ii) a data element, to generate an output which characterizes a likelihood that a given user would interact with the data element if the data element were presented to the given user on a webpage identified by a search result responsive to the search query.

16 Claims, 7 Drawing Sheets

(56) References Cited

U.S. PATENT DOCUMENTS

| | | | |
|---|---|---|---|
| 10,684,738 B1 * | 6/2020 | Sicora | G06F 16/435 |
| 10,769,501 B1 | 9/2020 | Ando et al. | |
| 10,877,643 B2 | 12/2020 | Wantland et al. | |
| 10,878,473 B1 * | 12/2020 | Thekkanal | G06Q 30/0641 |
| 11,157,488 B2 | 10/2021 | Feuz et al. | |
| 2011/0307425 A1 * | 12/2011 | Wang | G06F 16/9038 |
| | | | 707/E17.084 |
| 2014/0105488 A1 | 4/2014 | Geng et al. | |
| 2015/0154508 A1 | 6/2015 | Chen | |
| 2015/0242525 A1 | 8/2015 | Perlegos | |
| 2016/0092581 A1 * | 3/2016 | Joshi | G06F 16/9535 |
| | | | 707/732 |
| 2017/0364492 A1 | 12/2017 | Pushnyakov et al. | |
| 2018/0032997 A1 | 2/2018 | Gordon et al. | |
| 2018/0150466 A1 | 5/2018 | Paquet et al. | |
| 2018/0234496 A1 * | 8/2018 | Ratias | A63F 13/60 |
| 2018/0314715 A1 | 11/2018 | Ramesh et al. | |
| 2018/0365580 A1 | 12/2018 | Musuvathi et al. | |
| 2019/0012390 A1 * | 1/2019 | Nishant | G06N 3/006 |
| 2020/0027033 A1 | 1/2020 | Garg et al. | |
| 2020/0183960 A1 * | 6/2020 | Sharafi | G06F 16/3334 |
| 2020/0242633 A1 * | 7/2020 | Pogrebezky | G06Q 30/0201 |
| 2020/0334313 A1 | 10/2020 | Kussmaul et al. | |

FOREIGN PATENT DOCUMENTS

| | | | | |
|---|---|---|---|---|
| CA | 3012647 A1 * | 2/2019 | | G06F 16/5838 |
| CA | 3028646 A1 | 6/2019 | | |
| CA | 2807494 C * | 2/2020 | | G06F 16/252 |
| CN | 110463228 A * | 11/2019 | | G06F 16/9537 |
| EP | 3485394 B1 * | 12/2019 | | G06F 16/334 |
| TW | 202016757 A * | 5/2020 | | |
| WO | WO-2017151457 A1 * | 9/2017 | | G06F 16/334 |
| WO | WO-2017184204 A1 * | 10/2017 | | G06F 16/3334 |

\* cited by examiner

PRIVACY-SENSITIVE TRAINING OF USER INTERACTION PREDICTION MODELS

CROSS REFERENCE TO RELATED APPLICATION

This patent application is a continuation (and claims the benefit of priority under 35 USC 120) of U.S. patent application Ser. No. 16/393,777, filed Apr. 24, 2019. The disclosure of the prior application is considered part of (and is incorporated by reference in) the disclosure of this application.

BACKGROUND

This specification relates to collaborative training of machine learning models across multiple user devices.

The internet provides access to a wide variety of webpages and other information, such as that provided via an audio interface (e.g., verbally). A search system can identify webpages that are responsive to search queries. The search queries can include one or more search terms, images, audio data, or a combination thereof.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a global training system implemented as computer programs on one or more computers in one or more locations, and local training systems implemented on user devices, that can collaboratively train an interaction prediction machine learning model in a manner that respects user privacy.

According to a first aspect there is provided a method including transmitting data defining current parameter values of a machine learning model to each of multiple user devices over a data communication network. The machine learning model is configured to process an input including: (i) a search query, and (ii) a data element, to generate an output which characterizes a likelihood that a given user would interact with the data element if the data element were presented to the given user on a webpage identified by a search result responsive to the search query.

Each of the multiple user devices is configured to generate training examples for training the machine learning model based on interaction of a user of the user device with data elements presented to the user on webpages identified by search results responsive to search queries submitted by the user. Each user device processes the training examples to determine an update to the current parameter values of the machine learning model. Each user device transmits parameter update data defining the update to the current parameter values of the machine learning model over the data communication network.

The parameter update data transmitted by each of the multiple user devices over the data communication network is received and used to update the current parameter values of the machine learning model.

In some implementations, the search query includes textual data, image data, or both.

In some implementations, the data element includes a portion of text, an image, or both.

In some implementations, the output generated by the machine learning model characterizes a likelihood that a given user would copy the data element from the webpage.

In some implementations, the output generated by the machine learning model characterizes a likelihood that a given user would view the data element on the webpage for at least a threshold duration of time.

In some implementations, generating a training example for training the machine learning model includes determining that the user of the user device submits a particular search query to a search system, receives a set of search results responsive to the particular search query from the search system, navigates to a webpage identified by a particular search result, and interacts with a particular data element presented on the webpage. A training example is that characterizes the interaction of the user with the particular data element presented on the webpage is generated.

In some implementations, the training example includes: (i) a training input, and (ii) a target output that should be generated by the machine learning model by processing the training input. The training input includes the particular search query and the particular data element. The target output includes data indicating that the user interacted with the particular data element.

In some implementations, the machine learning model comprises a neural network model.

In some implementations, processing the training examples to determine the update to the current parameter values of the machine learning model includes, for each training example: processing the training input of the training example using the machine learning model, in accordance with the current parameter values of the machine learning model, to generate a corresponding output for the training example. A gradient of an objective function is determined with respect to the parameters of the machine learning model, where the objective function depends on the output generated by the machine learning model for the training example and the target output for the training example. The update to the current parameter values of the machine learning model is determined using the gradient.

In some implementations, the machine learning model is used in ranking search results.

In some implementations, the machine learning model is additionally configured to process context data that characterizes: (i) features of the webpage identified by the search result responsive to the search query, (ii) features of the given user, or (iii) both.

According to a second aspect there is provided a method performed by one or more data processing apparatus on a user device. The method includes receiving, by the user device, data defining current parameter values of a machine learning model over a data communication network. The user device generates training examples for training the machine learning model based on interaction of a user of the user device with data elements presented to the user on webpages identified by search results responsive to search queries submitted by the user. The user device processes the training examples to determine an update to the current parameter values of the machine learning model. The user device transmits parameter update data defining the update to the current parameter values of the machine learning model over the data communication network to a global training system.

The global training system is configured to receive the parameter update data transmitted by the user device over the data communication network and update the current parameter values of the machine learning model using the parameter update data received from the user device. The user device is one of multiple user devices that receives data defining the current parameter values of the machine learning model and determines respective updates to the current parameter values of the machine learning model.

According to a third aspect there is provided a system including one or more computers and one or more storage devices communicatively coupled to the one or more computers, where the one or more storage devices store instructions that, when executed by the one or more computers, cause the one or more computers to perform operations including the operations of the first or second aspect.

According to a fourth aspect there is provided one or more non-transitory computer readable storage media storing instructions that, when executed by one or more computers, cause the one or more computers to perform operations including the operations of the first or second aspect.

According to one example described herein, a method for generating a training example on a user device comprises, at the user device, submitting a search query to a search system. One or more search results are received from the search system responsive to the search query. A selection of one of the search results is received. An input is received, the input indicating interaction with a data element provided by the resource identified by the selected one of the search results. A training example is generated, based on the interaction, the training example comprising a training input and a target interaction score. The training input may comprise the search query and the data element. The target interaction score may be a numerical value indicating the interaction with the data element.

Particular embodiments of the subject matter described in this specification can be implemented so as to realize one or more of the following advantages.

This specification describes a method for training a machine learning model that can predict whether a user would interact with a "data element" presented on a webpage identified by a search result responsive to a search query submitted by the user. As will be described in more detail below, a data element can refer to, e.g., a portion of text or an image, and a user can interact with a data element, e.g., by copying it or by viewing it for at least a threshold duration of time. The trained machine learning model can be used by a search system to generate improved search results that are more responsive (i.e., more relevant) to search queries. Therefore, a search system using the trained machine learning model may consume fewer computational resources (e.g., memory, computing power, or both) than it otherwise would by reducing the number of search queries that users submit to retrieve relevant data. This is a technical improvement in the field of information retrieval.

The machine learning model can be trained in a manner that respects user privacy by using local training systems implemented directly on user devices. A local training system implemented on a user device can generate "local" training data that characterizes the interaction of a user of the device with webpages identified by search results responsive to search queries submitted by the user. The local training system can process the local training data on the user device to generate parameter value updates for the machine learning model, and transmit the parameter value updates to a "global" training system that updates a set of shared parameter values of the machine learning model. The parameter value updates transmitted from the user device by the local training system do not represent interpretable information that could compromise the privacy of the user. Moreover, the parameter value updates can be encrypted or otherwise protected before being transmitted from the user device. By processing the local training data directly on the user device without transferring it elsewhere (e.g., to a cloud computing environment), the privacy of the user of the device can be maintained while using the local training data to train the machine learning model. This is a technical improvement in the fields of machine learning and information retrieval.

The technology described in this specification enables the machine learning model to be trained on large amounts of training data generated locally by user devices. Therefore, the machine learning model can be trained to achieve greater prediction accuracy than would be possible if it were trained on a smaller amount of training data. This is also a technical improvement in the fields of machine learning and information retrieval.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a method for training a machine learning model that can predict whether a user would interact with a "data element" (e.g., a portion of text or an image) presented on a webpage identified by a search result responsive to a search query submitted by the user.

A large number (e.g., thousands) of user devices (e.g., smartphones) each generate "local" training data that characterizes the interaction of the user of the device with webpages identified by search results responsive to search queries submitted by the user. Local training data generated by a user device is processed on the user device by a "local" training system to generate parameter value updates for the machine learning model. The parameter value updates generated by the local training systems of the user devices are transmitted over a data communication network to a "global" training system that maintains a set of shared parameter values of the machine learning model. The global training system uses the parameter value updates generated by the local training systems to iteratively update the current parameter values of the machine learning model.

By using local training systems implemented on user devices, the machine learning model can be trained while maintaining user privacy. In particular, local training data characterizing the interaction of a user with webpages is generated, stored, and processed on the device of the user without being transferred elsewhere (e.g., to a cloud computing environment).

After being trained, the machine learning model can be used by a search system to rank search results provided in response to search queries.

These features and other features are described in more detail below.

Figure 1:
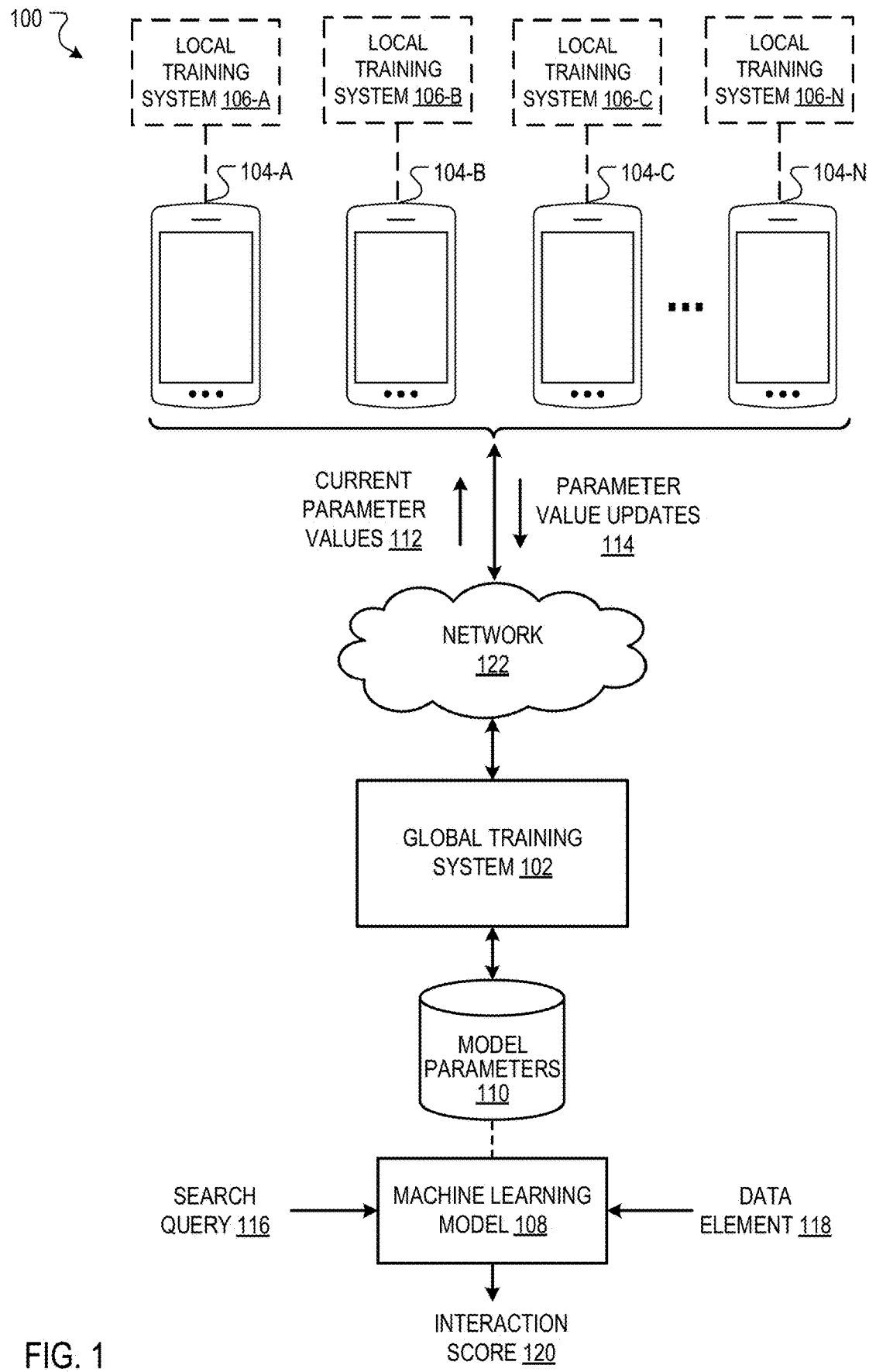
FIG. 1 shows an example federated learning environment that includes a global training system and a large number of user devices which implement a respective local training system.

FIG. 1 shows an example federated learning environment 100 that includes a global training system 102 and a large number of user devices 104A-N which each implement a respective local training system 106A-N.

The global training system 102 and the local training systems 106 collaboratively train a machine learning model 108. More specifically, the global training system 102 maintains a set of shared model parameter values 110 of the machine learning model 108. The local training systems of the user devices obtain the current model parameter values 112 from the global training system 102 and generate parameter value updates 114 to the model parameter values 110 using local training data generated on the user devices. The local training systems transmit the parameter value updates 114 to the global training system 102 for use in updating the model parameters 110 of the machine learning model 108.

The machine learning model 108 is configured to process an input including: (i) a search query 116, and (ii) a data element 118, to generate a corresponding interaction score 120.

The interaction score 120 characterizes a likelihood that a given user would interact with the data element 118 if the data element 118 were presented to the given user on a webpage identified by a search result responsive to the search query 116. The interaction score 120 can be represented in any appropriate numerical format, for example, as a numerical probability value between 0 and 1.

The machine learning model 108 can be configured to process other inputs in addition to the search query 116 and the data element 118. For example, the machine learning model 108 may process additional "context" data that characterize features of the webpage where the data element 118 would be presented, features of the user who would submit the search query 116, or both.

The context data may characterize any appropriate features of the webpage where the data element 118 would be presented. For example, the context data may characterize one or more of: the language of the webpage, the amount of text on the webpage, the number of images on the webpage, the number of videos on the webpage, the number of links on the webpage, the popularity of the webpage (e.g., measured by webpage traffic), the keywords appearing on the webpage, or an embedding (i.e., numerical representation) of the webpage (e.g., generated using another machine learning model).

The context data may characterize any appropriate features of the user who would submit the search query 116. For example, the context inputs may characterize one or more of: the language of the user (e.g., the default language on the browser being used by the user), the location of the user, or the time of day the user would submit the search query.

The search query 116 can include any appropriate form of data, e.g., textual query data, image query data, audio query data, or a combination thereof.

The data element 118 can also include any appropriate form of data, for example, a portion of text, an image, audio or a combination thereof.

As used in this specification, an interaction with a data element is a user action that can be attributed to the data element. A user can "interact" with a data element presented on a webpage in any of a variety of ways. For example, a user can interact with a data element presented on a webpage by copying the data element from the webpage (i.e., by performing actions that cause the data element to be stored locally on a device of the user). As another example, a user can interact with a data element presented on a webpage by viewing the data element for at least a threshold duration of time (e.g., by scrolling to a portion of a webpage that displays the data element and thereafter refraining from scrolling further for at least the threshold duration of time). As another example, a user can interact with a data element presented on a webpage by taking a screenshot of the data element. As another example, a user can interact with a data element presented on a webpage by entering text (or some other form of data) in a data entry field included in the data element. As another example, a user can interact with a data element provided in audio form by verbally interacting with or responding to the data element.

Broadly, the machine learning model 108 can generate accurate interaction scores by implicitly identifying semantic relationships between search queries and data elements (and, optionally, context data). In one example, the machine learning model 108 may process the search query: "revolutionary war years" and the portion of text (i.e., data element): "The American Revolutionary War started in 1775 and ended in 1783" to generate an interaction score of 0.37. In this example, the interaction score may indicate a 37% likelihood that a user viewing a webpage that includes the portion of text and that is identified by a search result responsive to the search query would copy the portion of text from the webpage.

The machine learning model 108 can be any appropriate model having a set of trainable model parameters 110 that can be iteratively trained on a set of training data. For example, the machine learning model 108 may be a neural network model, a random forest model, a support vector machine (SVM) model, or a linear model.

In one example, the machine learning model 108 may be a neural network model. The neural network model can have any appropriate neural network architecture. In one example, the neural network model may include a query embedding neural network and a data embedding neural network.

The query embedding neural network may be configured to process a search query to generate an embedding of the search query (i.e., a representation of the search query as an ordered collection of numerical values). For example, if the search query is represented by textual data, the query embedding neural network may be a long short-term memory (LSTM) neural network that sequentially processes the characters of the search query to generate the embedding of the search query.

The data embedding neural network may be configured to process a data element (and, optionally, context data) to generate an embedding of the data element (i.e., a representation of the data element as an ordered collection of numerical values). For example, if the data element is a portion of text, the data embedding neural network may be an LSTM neural network that sequentially processes the characters of the portion of text to generate the embedding of the portion of text.

The neural network model may generate the interaction score 120 by processing the embedding of the search query 116 generated by the query embedding neural network and the embedding of the data element 118 generated by the data embedding neural network. For example, the neural network model may generate the interaction score 120 by taking the inner product of the embedding of the search query 116 and the embedding of the data element 118. As another example, the neural network model may generate the interaction score 120 by processing the embedding of the search query 116 and the embedding of the data element 118 using one or more additional neural network layers.

In this example, the model parameters 110 of the machine learning model 108 may include weight matrices and bias vectors (i.e., parameters) that define operations performed by the neural network layers of the query embedding model and the data embedding model.

The global training system 102 is configured to maintain the model parameters 110 (e.g., in a logical data storage area or physical data storage device), and to train the machine learning model 108 by updating the values of the model parameters 110 at each of multiple training iterations.

At each training iteration, the global training system 102 transmits the current values 112 of the model parameters 110 to each of multiple user devices over a data communication network 122 (e.g., the internet). The local training system of each user device processes: (i) local training data generated on the user device, and (ii) the current values 112 of the model parameters 110, to generate a set of parameter value updates 114 to the model parameters 110 of the machine learning model 108. Local training data generated on a user device refers to data characterizing the interaction of a user of the device with webpages identified by search results responsive to search queries submitted by the user to a search system. An example of a local training system is described in more detail with reference to FIG. 2, and an example of a search system is described in more detail with reference to FIG. 4.

The local training systems 106A-N of the user devices 104A-N transmit the parameter value updates 114 to the global training system 102 over the network 122, and the global training system 102 uses the parameter value updates 114 to adjust the current values of the model parameters 110. For example, the global training system 102 can combine the parameter value updates 114 received from each of the user devices (e.g., by averaging them), scale the combined parameter value update by a "learning rate" hyper-parameter, and add the result to the current values of the model parameters 110.

The global training system 102 may use either "synchronous" or "asynchronous" training techniques to train the model parameters 110. In synchronous training, the global training system 102 only uses parameter value updates 114 generated by a local training system with respect to the current values of the model parameters 110 to adjust the current values of the model parameters 110. In asynchronous training, the global training system 102 may use parameter value updates 114 generated by a local training system with respect to previous values of the model parameters 110 to adjust the current values of the model parameters 110.

By adjusting the current values of the model parameters 110 using the parameter value updates 114 generated by the local training systems 106A-N of the user devices 104A-N, the global training system 102 enables the machine learning model to generate interaction scores 120 with greater accuracy.

Generally, the global training system 102 is located remotely from each of the user devices 104A-N (and, by extension, the local training systems 106A-N). The global training system 102 and the user devices 106A-N communicate with one another by transmitting data over the data communication network 122 (e.g., the internet).

Generally, some or all of the local training data generated on a user device may be considered "private". That is, the local training data may include information that is personal to the user of the device (e.g., data the user copies from certain webpages) and should not be transferred from the user device in order to respect the privacy of the user. To maintain the privacy of the user, the local training system on a user device stores and processes the local training data on the user device (i.e., without transferring it elsewhere). The parameter value updates 114 that are transmitted from the local training system of the user device to the global training system 102 do not represent interpretable information that could compromise the privacy of the user. Moreover, the parameter value updates 114 can be encrypted and otherwise protected while being transferred over the network 122 to the global training system 102.

A user device refers to an electronic device that is under control of a user and is capable of transmitting and receiving data over a data communication network (e.g., the internet). Example user devices include personal computers, mobile communication devices (e.g., smartphones), personal digital assistants and speech-enabled devices. The user devices included in FIG. 1 are depicted as smartphones for illustrative purposes only. A user device typically includes user applications (e.g., a web browser) which facilitate transmitting and receiving data. In particular, user applications included in a user device enable the user device to transmit search queries to a search system, and to receive search results provided by the search system in response to the search queries.

Generally, the user of a device is provided with an option to "opt-out" from having local training data generated on the user device used to train the machine learning model 108. Moreover, the local training system on a user device may be configured to operate in a manner that minimizes any impact on the user of the device. For example, the local training system may perform operations to generate parameter value updates 114 only in response to determining that the user device is idle, connected to a free network (e.g., internet) connection, and charging (e.g., plugged in).

In contrast to a local training system residing on a user device, the global training system 102 can be implemented by one or more computers located in one or more locations. For example, the global training system 102 may be hosted within a data center, which can be a distributed computing system having hundreds or thousands of computers in one or more locations.

Figure 2:
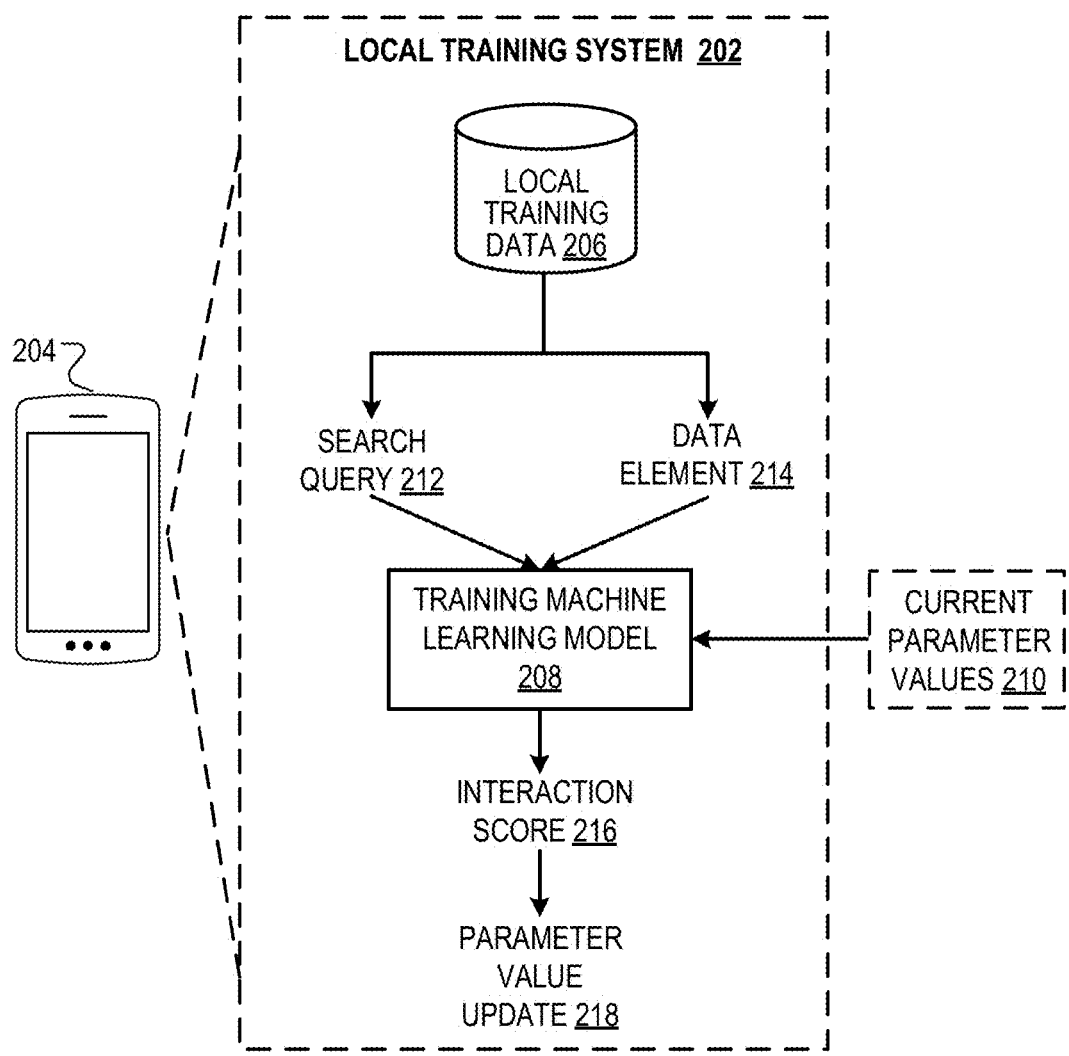
FIG. 2 is a block diagram of an example local training system implemented on a user device.

FIG. 2 is a block diagram of an example local training system 202 implemented on a user device 204.

The local training system 202 includes a set of local training data 206 and a training machine learning model 208. The training machine learning model 208 is maintained on the user device 204 and has substantially the same architecture as the machine learning model 108 (as described with reference to FIG. 1).

The local training data 206 includes multiple training examples. Each training example includes: (i) a training input, and (ii) a target interaction score that should be generated by the machine learning model 108 by processing the training input.

Each training input includes: (i) a search query, and (ii) a data element (e.g., a portion of text or an image). Optionally, each training input may include context data.

The target interaction score defines whether (or how) the user of the device 204 interacted with the data element after the data element was presented on a webpage identified by a search result responsive to a search query submitted by the user. In some implementations, the target interaction score is a "classification" score, that is, a score that can have each of a finite number of possible values. For example, the target interaction score may be a binary (i.e., 0/1) score that indicates whether the user copied the data element from the webpage, or viewed the data element on the webpage for at least a threshold duration of time (as described earlier). In some implementations, the target interaction score is a "regression" score, that is, a score that can have infinitely many possible values. For example, the target interaction score may be a non-negative numerical value that indicates a duration of time that the user viewed the data element.

The local training system 202 can continuously generate the local training data 206 by monitoring the interaction of the user with webpages identified by search results responsive to search queries submitted by the user to a search system. In response to determining that the user submits a search query to a search system, receives a set of search results responsive to the search query from the search system, navigates to a webpage identified by a search result, and interacts with a data element presented on the webpage, the local training system 202 can generate and store a corresponding training example that characterizes the interaction. Conversely, in response to determining that the user does not interact with a data element presented on the webpage, the local training system 202 can generate and store a corresponding training example based on the lack of interaction of the user with the data element.

As described earlier, some or all of the local training data 206 may be considered "private", and therefore the local training system 202 stores and processes the local training data 206 on the user device 204 without transferring it elsewhere.

The local training system 202 may allocate a fixed amount of memory for storing the local training data 206, and may overwrite "old" training examples with "new" training examples as they are generated in accordance with any appropriate replacement policy. For example, the local training system 202 may overwrite training examples in accordance with a first-in-first-out (FIFO) replacement policy.

At each of multiple training iterations, the local training system 202 obtains the current parameter values 210 of the machine learning model 108 from the global training system 102 and uses the local training data 206 to determine parameter value updates 218 for the model parameters 110.

The operations performed by the local training system 202 to determine the parameter value updates 218 depend on the specific architecture of the training machine learning model 208 (e.g., whether the training machine learning model 208 is a neural network model or a random forest model). For convenience, the description of determining the parameter value updates 218 which follows refers to an implementation where the training machine learning model is a neural network model (or similar model).

To determine the parameter value updates 218, the local training system 202 processes training examples from the local training data 206 using the training machine learning model 208 in accordance with the current parameter values 210 of the machine learning model 108. That is, for each of one or more training examples from the local training data 206, the local training system 202 processes the search query 212 and the data element 214 (and, optionally, context data) included in the local training example using the training machine learning model 208 to generate a corresponding interaction score 216.

The local training system 202 generates the parameter value updates 218 based on: (i) the interaction scores 216 generated by the training machine learning model 208, and (ii) the target interaction scores included in the training examples.

For example, the local training system 202 may determine a parameter value update 218 corresponding to a training example as a gradient of an objective function with respect to the current parameter values 210 of the machine learning model 108. In this example, the objective function depends on the interaction score 216 generated by the training machine learning model 208 for the training example and the target interaction score for the training example.

The objective function may be, for example, a cross-entropy objective function (e.g., if the interaction scores are classification scores) or a squared-error objective function (e.g., if the interaction scores are regression scores).

The local training system 202 can determine the gradient of the objective function in any appropriate manner, for example, using a backpropagation technique. A parameter value update 218 corresponding to a training example can be represented as an ordered collection of numerical values (e.g., a vector of numerical values), with a respective component corresponding to each model parameter of the machine learning model 108.

The local training system 202 can generate an overall parameter value update 218 by combining (e.g., averaging) the parameter value updates 218 corresponding to each training example in the local training data 206. After determining that a termination criterion is satisfied (e.g., because parameter value updates 218 have been generated for a predetermined number of training examples from the local training data 206), the local training system 202 transmits the overall parameter value update 218 to the global training system 102. Rather than directly transmitting the overall parameter value update 218 to the global training system 102, the local training system 202 can transmit a processed representation of the overall parameter value update 218, e.g., which is encrypted, compressed, or both.

Figure 3:
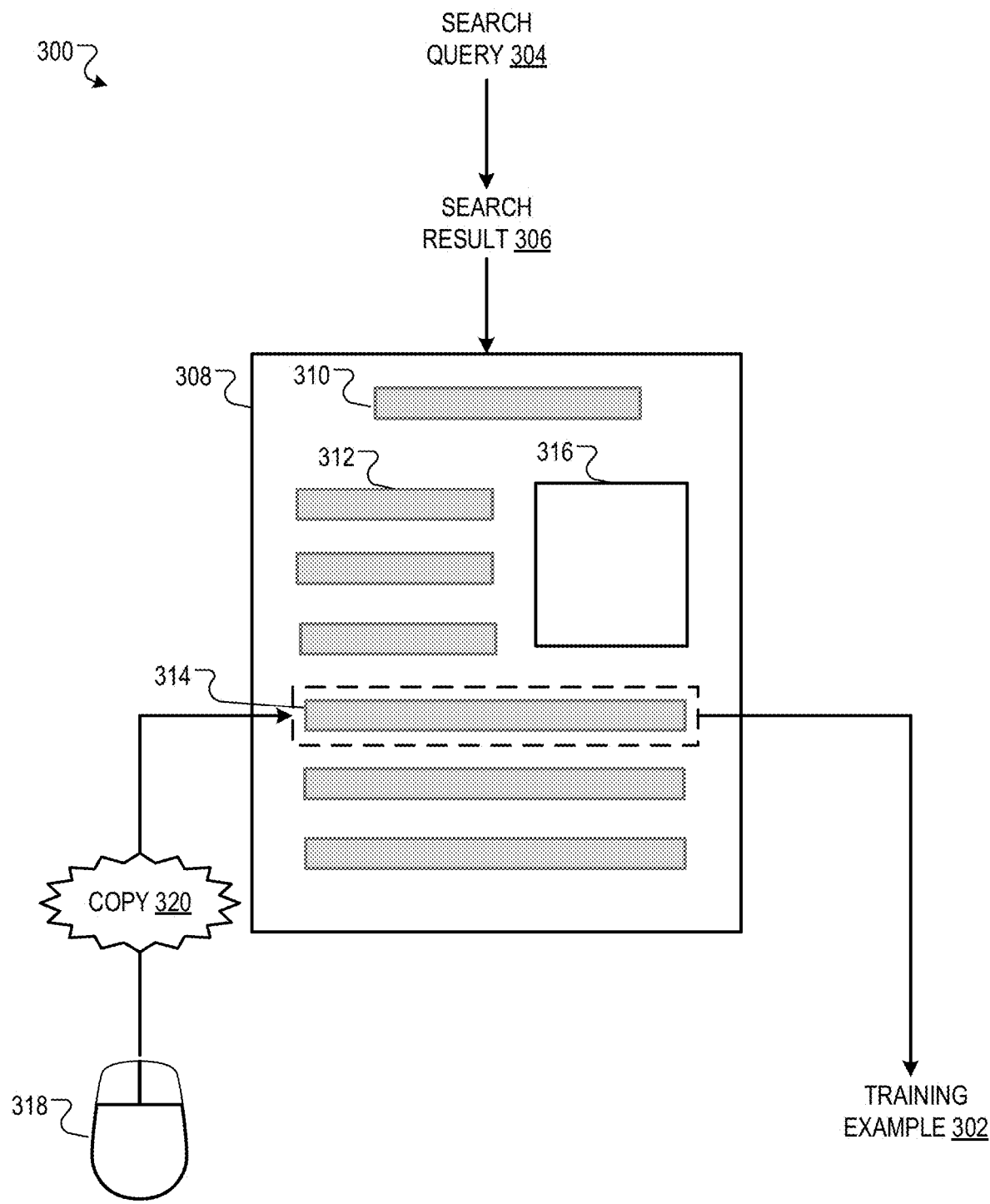
FIG. 3 is a flow diagram of an example data flow for generating a training example on a user device.

FIG. 3 is a flow diagram of an example data flow 300 for generating a training example 302 on a user device. A user of the user device submits a search query 304 to a search system, receives one or more search results responsive to the search query 304 from the search system, and selects a search result 306 that identifies a webpage 308. The webpage includes portions of text 310, 312, and 314, and an image 316.

The user identifies that the portion of text 314 is particularly relevant to the search query 304, and uses a mouse 318 to copy 320 the portion of text 314 from the webpage 308. Thereafter, a local training system on the user device can generate a training example 302 that includes: (i) a training input, and (ii) a target interaction score, based on the interaction of the user with the portion of text 314. For example, the training input may include the search query 304 and the portion of text 314, and the target interaction score may be a numerical value indicating that the user interacted with the portion of text 314. Optionally, the training example 302 can include context data that characterize features of the webpage 308, features of the user of the user device, or both.

The local training system can also generate one or more training examples based on the data elements (e.g., portions of text or images) included on the webpage 308 that the user did not interact with. For example, the local training system can generate a training example with a training input that includes the search query 304 and the data elements 310, 312, or 316. The target interaction score for the training example may be a numerical value indicating that the user did not interact with the data element specified by the training input.

Figure 4:
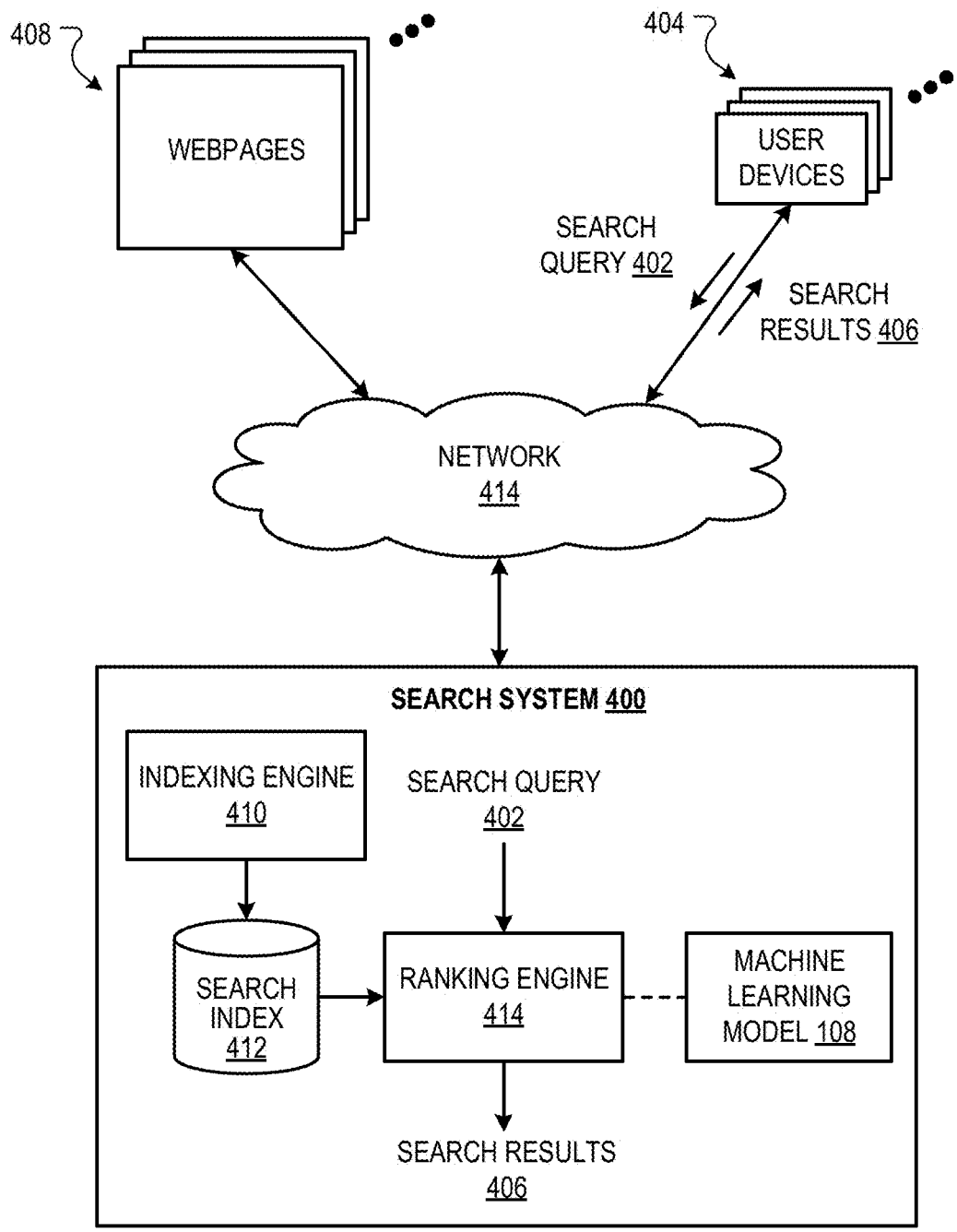
FIG. 4 shows an example search system.

FIG. 4 shows an example search system 400. The search system 400 is an example of a system implemented as computer programs on one or more computers in one or more locations in which the systems, components, and techniques described below are implemented. As will be described in more detail below, the search system 400 can use the machine learning model 108 (described with reference to FIG. 1) to identify search results responsive to search queries.

The search system 400 is configured to receive a search query 402 from a user device 404, to process the search query 402 to determine one or more search results 406 responsive to the search query 402, and to provide the search results 406 to the user device 404. The search query 402 can include search terms expressed in a natural language (e.g., English), images, audio data, or any other appropriate form of data. A search result 406 identifies a webpage 408 that is responsive to the search query 402, and includes a link to the webpage 408. Webpages 408 can include content in any appropriate format, for example, images, text, and videos.

A network 414, such as a local area network (LAN), wide area network (WAN), the Internet, a mobile phone network, or a combination thereof, connects the webpages 408, the user devices 404, and the search system 400. In general, the network 414 can connect the search system 400 to many thousands of webpages 408 and user devices 404.

As described earlier, a user device 404 is an electronic device that is under control of a user and is capable of transmitting and receiving data over the network 414. The user applications included in the user device 404 can present the search results 406 received from the search system 400 to a user of the user device (e.g., by rendering a search results page which shows an ordered list of the search results 406). The user may select one of the search results 406 presented by the user device 404 (e.g., by clicking on a hypertext link included in the search result 406), which can cause the user device 404 to generate a request for a webpage 408 identified by the search result 406.

The search system 400 uses an indexing engine 410 to generate and maintain the search index 412 by "crawling" (i.e., systematically browsing) the webpages 408. For each of a large number (e.g., millions) of webpages 408, the search index 412 indexes the webpage by maintaining data which identifies the webpage 408 (e.g., by a link to the webpage 408).

The ranking engine 414 determines search results 406 responsive to the search query 402 by scoring webpages 408 indexed by the search index 412. The "relevance score" determined by the ranking engine 414 for a webpage characterizes how responsive (e.g., relevant) the webpage is to the search query 402. The ranking engine 414 determines a ranking of the webpages indexed by the search index 412 based on their respective relevance scores, and determines the search results based on the ranking. For example, the ranking engine 414 can generate search results 406 which identify the highest-ranked webpages 408 indexed by the search index 412. As will be described in more detail with reference to FIG. 5, the ranking engine 414 can use the machine learning model 108 to generate relevance scores for the webpages 408 indexed by the search index 412.

Figure 5:
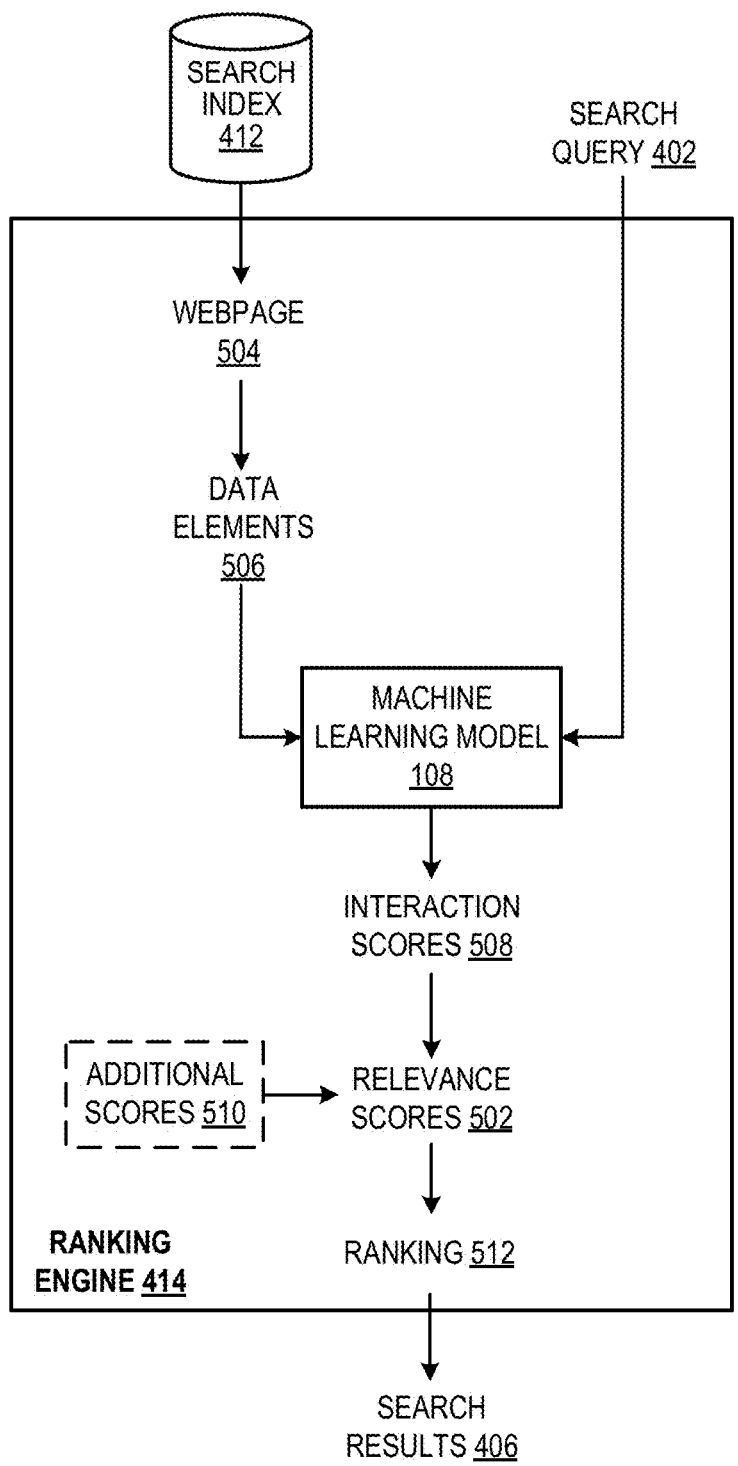
FIG. 5 shows an example ranking engine.

FIG. 5 shows an example ranking engine 414. The ranking engine 414 is an example of an engine implemented as computer programs on one or more computers in one or more locations in which the systems, components, and techniques described below are implemented.

The ranking engine 414 determines a respective relevance score 502 for each of multiple "candidate" webpages 504 indexed by the search index 412 using the (trained) machine learning model 108. The relevance score 502 for a candidate webpage is a numerical value which characterizes a relevance of the candidate webpage to the search query 402.

In some cases, the candidate webpages 504 may include every webpage indexed by the search index 412, while in other cases, the candidate webpages 504 may include only a proper subset of the webpages indexed by the search index 412. In a particular example, the ranking engine 414 may determine an initial ranking of the webpages indexed by the search index 412 using a "fast" ranking method that can be performed quickly and consumes few computational resources. The initial ranking of the webpages indexed by the search index 412 can approximately (i.e., roughly) rank webpages based on how responsive they are to the search query 402. After determining the initial ranking of the webpages indexed by the search index 412, the ranking engine 414 can determine a set of highest-ranked webpages according to the initial ranking method as the candidate webpages 504.

To determine the relevance score 502 for a candidate webpage 504, the ranking engine 414 extracts one more data elements 506 (e.g., portions of text or images) from the webpage 504. For example, the ranking engine 414 may extract a predetermined number of paragraphs of text from the webpage 504. Optionally, the ranking engine 414 may also extract context data characterizing features of the webpage 504.

For each data element 506 extracted from the webpage 504, the ranking engine 414 processes the data element 506 and the search query 402 using the machine learning model 108, in accordance with the trained parameter values of the machine learning model 108, to generate a respective interaction score 508. As described earlier, the interaction score 508 for a data element 506 characterizes a likelihood that a given user would interact with the data element 506 if the data element 506 were presented to the given user on a webpage identified by a search result responsive to the search query 402. Optionally, the machine learning model 108 may process additional context data (e.g., which characterize features of the webpage 504, the user who submitted the search query 402, or both) to generate the interaction score 508.

The ranking engine 414 determines the relevance score 502 for the webpage 504 based at least in part on the interaction scores 508 generated by the machine learning model 108 for the data elements 506 included in the webpage 504. For example, the ranking engine 414 may determine the relevance score 502 for the webpage 504 based on the sum, the average, the median, or the maximum of the interaction scores 508 for the data elements 506 included in the webpage 504. As another example, the ranking engine 414 may determine the relevance score 502 for the webpage 504 by processing an input including the interaction scores 508 for the data elements 506 included in the webpage 504 using another machine learning model (e.g., neural network model).

Optionally, the ranking engine 414 can compute one or more additional scores for the webpage 504, and thereafter determine the relevance score 502 for the webpage 504 based on: (i) the interaction scores 508, and (ii) the additional scores 510. The ranking engine 414 may determine the additional scores 510 based on the language of the webpage 504, the number of inbound links to the webpage 504, the number of outbound links from the webpage 504, and the keywords included in the webpage 504.

The ranking engine 414 determines a ranking 512 of the candidate webpages 504 based on the relevance scores 502, and generates the search results 406 based on the ranking 512. For example, the ranking engine 414 can generate search results 406 which identify the highest-ranked candidate webpages 504.

Optionally, to reduce latency during generation of the ranking 512, the ranking engine 414 may precompute some or all of the data required to generate the interaction scores 508 for the webpages 504 indexed by the search index 412. For example, as described with reference to FIG. 1, the machine learning model 108 may be a neural network model that includes a query embedding neural network (i.e., configured to generate embedding of search queries) and a data embedding neural network (i.e., configured to generate embeddings of data elements). In this example, the ranking engine 414 may precompute embeddings of the data elements 506 included in each of the webpages 504 indexed by the search index using the data embedding neural network.

Figure 6:
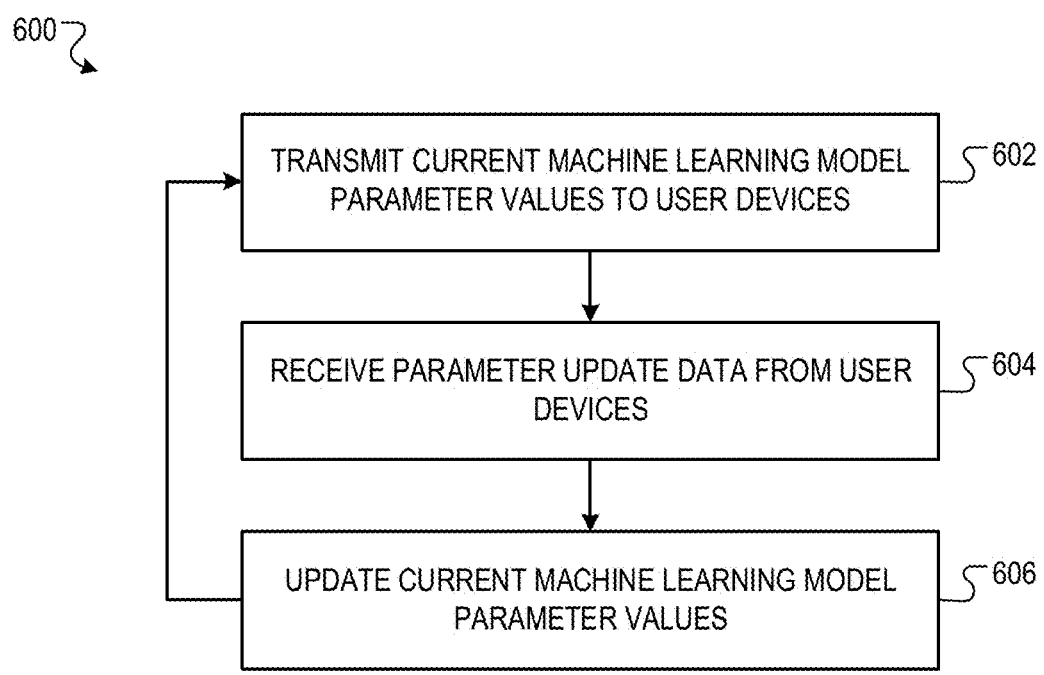
FIG. 6 is a flow diagram of an example process for updating the current parameter values of a machine learning model using a global training system.

FIG. 6 is a flow diagram of an example process 600 for updating the current parameter values of a machine learning model. For convenience, the process 600 will be described as being performed by a system of one or more computers located in one or more locations. For example, a global training system, e.g., the global training system 102 of FIG. 1, appropriately programmed in accordance with this specification, can perform the process 600.

The system transmits data defining the current parameter values of the machine learning model to each of multiple user devices over the data communication network (602). For example, the system may transmit data defining the current parameter values of the machine learning model to a predetermined number of randomly selected user devices. In some cases, the system may transmit a representation of the current parameter values of the machine learning model that is compressed, encrypted, or both.

The system receives parameter update data from one or more of the user devices over the data communication network (604). Generally, the parameter update data received from a user device defines an update to the current parameter values of the machine learning model. In some implementations, the parameter update data received from a user device defines an adjustment to the current parameter values of the machine learning model. In some implementations, the parameter update data received from a user device directly defines updated parameter values of the machine learning model. The parameter update data received from a user device may be compressed, encrypted, or both. The system can decompress and decrypt the parameter update data receive from a user device as necessary.

The system updates the current parameter values of the machine learning model using the parameter update data received from the user devices (606). For example, the system can combine (e.g., average) the parameter update data received from each of the user devices, scale the combined parameter update data by a learning rate hyper-parameter, and add the result to the current values of the machine learning model parameters.

After updating the current parameter values of the machine learning model, the system can determine whether a training termination criterion is met. For example, the system may determine that a training termination criterion is met if a predetermined number of iterations of the process 600 (i.e., "training iterations") have been performed. In response to determining that a training termination criterion is met, the system can provide the trained parameter values of the machine learning model, e.g., for use by a ranking engine of a search system (e.g., as described with reference to FIG. 5). In response to determining that a training termination criterion is not met, the system can return to step 602 and perform another training iteration.

Figure 7:
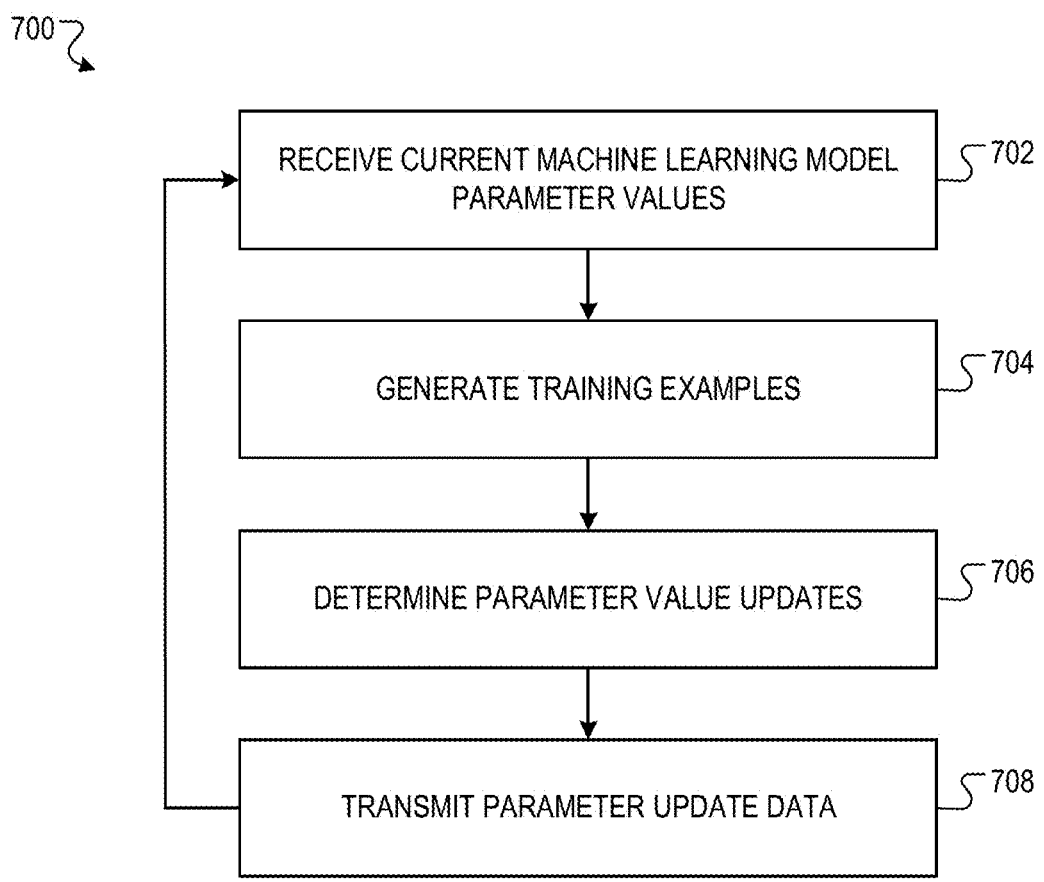
FIG. 7 is a flow diagram of an example process for determining parameter update data that defines an update to the current parameter values of a machine learning model using a local training system implemented on a user device.

FIG. 7 is a flow diagram of an example process 700 for determining parameter update data that defines an update to the current parameter values of a machine learning model. For convenience, the process 700 will be described as being performed by a system including hardware and software components located on a user device. For example, a local training system, e.g., the local training systems 106A-N of FIG. 1, appropriately programmed in accordance with this specification, can perform the process 700.

The system receives data defining current parameter values of the machine learning model over a data communication network (702). The data defining the current parameter values of the machine learning model may be may be compressed, encrypted, or both. The system can decompress and decrypt the data defining the current parameter values of the machine learning model as necessary. In one example, the machine learning model may be a neural network model, and the current parameter values of the machine learning model may include the values of the components of the weight matrices and bias vectors that define operations performed by the layers of the neural network model.

The system generates training examples for training the machine learning model based on interaction of a user of the user device with data elements (e.g., portions of text or images) presented to the user on webpages identified by search results responsive to search queries submitted by the user (704). Generally, the system continually generates the training examples, both before and after receiving the current parameter values of the machine learning model.

Each training example includes: (i) a training input, and (ii) a target interaction score that should be generated by the machine learning model by processing the training input. Each training input includes: (i) a search query, and (ii) a data element (e.g., a portion of text or an image), and optionally, context data that characterize features of the webpage where the data element was presented, features of the user of the device, or both. The target interaction score defines whether (or how) the user of the device interacted with the data element after the data element was presented on a webpage identified by a search result identified by a search query submitted by the user.

In response to determining that the user submits a search query to a search system, receives a set of search results responsive to the search query from the search system, navigates to a webpage identified by a search result, and interacts with a data element presented on the webpage, the system can generate and store a corresponding training example that characterizes the interaction.

The system determines parameter update data defining an update to the current parameter values of the machine learning model (706). To determine the parameter update data, the system processes the training inputs from one or more training examples using a replica of the machine learning model, in accordance with the current parameter values of the machine learning model, to generate corresponding interaction scores. Thereafter, the system determines the parameter update data based on: (i) the interaction scores generated by the replica of the machine learning model, and (ii) the target interaction scores included in the training examples.

In one example, the machine learning model may be a neural network model, and the system may determine respective parameter update data for each training example. To determine the parameter update data for a training example, the system may determine a gradient of an objective function with respect to the current parameter values of the machine learning model (e.g., using a backpropagation technique). Generally, the objective function depends on: (i) the interaction score generated for the training example by the replica of the machine learning model, and (ii) the target interaction score for the training example. For example, the objective function may be a cross-entropy objective function or a squared-error objective function. After determining respective parameter update data for each training example, the system may determine the overall parameter update data by combining (e.g., averaging) the parameter update data determined for each training example.

The system transmits the (overall) parameter update data defining an update to the current parameter values of the machine learning model to the global training system over a data communication network (708). Optionally, the system may compress the parameter update data, encrypt the parameter update data, or both, before transmitting it to the global training system.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus, the method comprising:
transmitting, by the data processing apparatus, data defining current parameter values of a machine learning model to each of a plurality of user devices over a data communication network, wherein:

the machine learning model is configured to process an input comprising: (i) a search query, and (ii) a data element, to generate an output which characterizes a likelihood that a given user would interact with the data element if the data element were presented to the given user on a webpage identified by a search result responsive to the search query; and each of the plurality of user devices is configured to:
maintain a local instance of the machine learning model;

generate training examples for training the local instance of the machine learning model based on interaction of a user of the user device with data elements presented to the user on webpages identified by search results responsive to search queries submitted by the user, wherein generating a training example for training the local instance of the machine learning model comprises:

determining that the user of the user device: submits a particular search query to a search system, receives a set of search results responsive to the particular search query from the search system, navigates to a webpage identified by a particular search result, and interacts with a particular data element presented on the webpage; and generating a training example that comprises: (i) a training input, and (ii) a target output that should be generated by the machine learning model by processing the training input, wherein the training input comprises the particular search query and the particular data element, and wherein the target output comprises data indicating that the user interacted with the particular data element;

train the local instance of the machine learning model on the training examples, using machine learning training techniques, to determine an update to the current parameter values of the machine learning model received from the data processing apparatus; and transmit, to the data processing apparatus, parameter update data defining the update to the current parameter values of the machine learning model over the data communication network;

receiving, from each of the plurality of user devices and by the data processing apparatus, the parameter update data transmitted by the user device over the data communication network; and updating, by the data processing apparatus, the current parameter values of the machine learning model using the respective parameter update data received from each of the plurality of user devices.

2. The method of claim 1, wherein the search query comprises textual data, image data, or both.

3. The method of claim 1, wherein the data element comprises a portion of text, an image, or both.

4. The method of claim 1, wherein the output generated by the machine learning model characterizes a likelihood that a given user would copy the data element from the webpage.

5. The method of claim 1, wherein the output generated by the machine learning model characterizes a likelihood that a given user would view the data element on the webpage for at least a threshold duration of time.

6. The method of claim 1, wherein the machine learning model comprises a neural network model.

7. The method of claim 6, wherein training the local instance of the machine learning model on the training examples to determine the update to the current parameter values of the machine learning model comprises, for each training example:

processing the training input of the training example using the local instance of the machine learning model, in accordance with the current parameter values of the machine learning model, to generate a corresponding output for the training example;

determining a gradient of an objective function with respect to the parameters of the machine learning model, wherein the objective function depends on the output generated by the local instance of the machine learning model for the training example and the target output for the training example; and determining the update to the current parameter values of the machine learning model using the gradient.

8. The method of claim 1, wherein the machine learning model is used in ranking search results.

9. The method of claim 1, wherein the machine learning model is additionally configured to process context data that characterizes: (i) features of the webpage identified by the search result responsive to the search query, (ii) features of the given user, or (iii) both.

10. A method performed by one or more data processing apparatus on a user device, the method comprising:

maintaining a local instance of a machine learning model;

receiving, by the user device, data defining current parameter values of the machine learning model over a data communication network, wherein the machine learning model is configured to process an input comprising: (i) a search query, and (ii) a data element, to generate an output which characterizes a likelihood that a given user would interact with the data element if the data element were presented to the given user on a webpage identified by a search result responsive to the search query;

generating, by the user device, training examples for training the machine learning model based on interaction of a user of the user device with data elements presented to the user on webpages identified by search results responsive to search queries submitted by the user, wherein generating a training example for training the local instance of the machine learning model comprises:

determining that the user of the user device: submits a particular search query to a search system, receives a set of search results responsive to the particular search query from the search system, navigates to a webpage identified by a particular search result, and interacts with a particular data element presented on the webpage; and generating a training example that comprises: (i) a training input, and (ii) a target output that should be generated by the machine learning model by processing the training input, wherein the training input comprises the particular search query and the particular data element, and wherein the target output comprises data indicating that the user interacted with the particular data element;

training, by the user device, the local instance of the machine learning model on the training examples using machine learning training techniques to determine an update to the current parameter values of the machine learning model; and transmitting, by the user device and to a global training system, parameter update data defining the update to the current parameter values of the machine learning model over the data communication network;

wherein the global training system is configured to:
receive the parameter update data transmitted by the user device over the data communication network; and
update the current parameter values of the machine learning model using the parameter update data received from the user device;

wherein the user device is one of a plurality of user devices that receives data defining the current parameter values of the machine learning model and determines respective updates to the current parameter values of the machine learning model.

11. A system comprising:

one or more computers; and one or more storage devices communicatively coupled to the one or more computers, wherein the one or more storage devices store instructions that, when executed by the one or more computers, cause the one or more computers to perform operations comprising:

transmitting, by the one or more computers, data defining current parameter values of a machine learning model to each of a plurality of user devices over a data communication network, wherein:

the machine learning model is configured to process an input comprising: (i) a search query, and (ii) a data element, to generate an output which characterizes a likelihood that a given user would interact with the data element if the data element were presented to the given user on a webpage identified by a search result responsive to the search query; and each of the plurality of user devices is configured to:
maintain a local instance of the machine learning model;
generate training examples for training the machine learning model based on interaction of a user of the user device with data elements presented to the user on webpages identified by search results responsive to search queries submitted by the user, wherein generating a training example for training the local instance of the machine learning model comprises:
determining that the user of the user device:
submits a particular search query to a search system, receives a set of search results responsive to the particular search query from the search system, navigates to a webpage identified by a particular search result, and interacts with a particular data element presented on the webpage; and
generating a training example that comprises: (i) a training input, and (ii) a target output that should be generated by the machine learning model by processing the training input, wherein the training input comprises the particular search query and the particular data element, and wherein the target output comprises data indicating that the user interacted with the particular data element;
train the local instance of the machine learning model on the training examples, using machine learning training techniques, to determine an update to the current parameter values of the machine learning model received from the one or more computers; and
transmit, to the one or more computers, parameter update data defining the update to the current parameter values of the machine learning model over the data communication network;
receiving, from each of the plurality of user devices and by the one or more computers, the parameter update data transmitted by the user device over the data communication network; and
updating, by the one or more computers, the current parameter values of the machine learning model using the respective parameter update data received from each of the plurality of user devices.

12. The system of claim 11, wherein the search query comprises textual data, image data, or both.

13. The system of claim 11, wherein the data element comprises a portion of text, an image, or both.

14. The system of claim 11, wherein the output generated by the machine learning model characterizes a likelihood that a given user would copy the data element from the webpage.

15. The system of claim 11, wherein the output generated by the machine learning model characterizes a likelihood that a given user would view the data element on the webpage for at least a threshold duration of time.

16. The system of claim 11, wherein the machine learning model comprises a neural network model.

* * * * *